United States Patent
Mandal et al.

(10) Patent No.: US 10,502,854 B2
(45) Date of Patent: Dec. 10, 2019

(54) REAL-TIME ADAPTIVE MINIMUM PHASE WAVELET GENERATION FOR DOWNHOLE TOOLS

(71) Applicant: Halliburton Energy Services, Inc., Houston, TX (US)

(72) Inventors: Batakrishna Mandal, Missouri City, TX (US); Yinghui Lu, The Woodlands, TX (US)

(73) Assignee: Halliburton Energy Services, Inc., Houston, TX (US)

(*) Notice: Subject to any disclaimer, the term of this patent is extended or adjusted under 35 U.S.C. 154(b) by 435 days.

(21) Appl. No.: 15/312,748

(22) PCT Filed: Apr. 28, 2016

(86) PCT No.: PCT/US2016/029755
§ 371 (c)(1),
(2) Date: Nov. 21, 2016

(87) PCT Pub. No.: WO2016/191029
PCT Pub. Date: Dec. 1, 2016

(65) Prior Publication Data
US 2017/0205524 A1 Jul. 20, 2017

Related U.S. Application Data

(60) Provisional application No. 62/165,763, filed on May 22, 2015.

(51) Int. Cl.
*G01V 1/50* (2006.01)
*E21B 47/00* (2012.01)

(52) U.S. Cl.
CPC .............. *G01V 1/50* (2013.01); *E21B 47/00* (2013.01)

(58) Field of Classification Search
CPC .. G01V 1/44; G01V 1/50; E21B 47/00; E21B 47/00
See application file for complete search history.

(56) References Cited

U.S. PATENT DOCUMENTS

| | | | |
|---|---|---|---|
| 5,995,447 A * | 11/1999 | Mandal | G01V 1/44 181/106 |
| 6,470,749 B1 | 10/2002 | Han et al. | |
| 6,856,936 B1 | 2/2005 | Chen et al. | |
| 2006/0198243 A1 | 9/2006 | Tang et al. | |

(Continued)

OTHER PUBLICATIONS

International Preliminary Report on Patentability issued in related Application No. PCT/US2016/029755, dated Dec. 12, 2017, 11 pages.

(Continued)

*Primary Examiner* — Kyle R Quigley
(74) *Attorney, Agent, or Firm* — Benjamin Fite; Baker Botts L.L.P.

(57) ABSTRACT

An example method may include selecting a proposed pulse. A minimum phase wavelet may be generated based, at least in part, on the proposed pulse. A pulse signal within a wellbore may be generated based, at least in part, on the minimum phase wavelet. An echo signal corresponding to the pulse signal from at least a portion of the wellbore may be received, wherein the echo signal is indicative of a wellbore property.

17 Claims, 4 Drawing Sheets

(56) References Cited

U.S. PATENT DOCUMENTS

2008/0037371 A1\* 2/2008 Chang ................ G01S 7/52004
  367/137
2011/0096629 A1 4/2011 Raphael
2011/0188350 A1\* 8/2011 Russo .................... G10K 11/00
  367/141

OTHER PUBLICATIONS

International Search Report and Written Opinion issued in related PCT Application No. PCT/US2016/029755 dated Aug. 9, 2016, 14 pages.
Oppenheim, Alan V., et al. Digital signal processing. Research Laboratory of Electronics (RLE) at the Massachusetts Institute of Technology (MIT), 1987.

\* cited by examiner

REAL-TIME ADAPTIVE MINIMUM PHASE WAVELET GENERATION FOR DOWNHOLE TOOLS

CROSS-REFERENCE TO RELATED APPLICATION

The present application is a U.S. National Stage Application of International Application No. PCT/US2016/029755 filed Apr. 28, 2016, which claims benefit of U.S. Provisional Application No. 62/165,763 filed May 22, 2015, both of which are incorporated herein by reference in their entirety for all purposes.

The present disclosure relates generally to well logging, drilling, and completion operations and, more particularly, to systems and methods for real-time adaptive minimum phase wavelet signal generation in a downhole tool.

Well logging, drilling, and completion operations sometimes require the use of casings within a wellbore in a subterranean formation to ensure that the wellbore does not collapse once it is drilled and that sensitive areas of the formation are protected and isolated. In most cases the casings are secured in the wellbore using a cement layer that fills an annulus between and bonds to both the casing and the formation. The strength of both cement bonds is important to the integrity of the well. Measuring cement impedance can provide information about the strength of the cement bonds.

Some casing and cement evaluation tools transmit an acoustic pulse signal into the casing and cement layer, and receive an echo signal of that pulse. The echo signal may include reflections and reverberations caused by the casing, the cement layer, and/or interface between the two. These reflections and reverberations may be used, in part, to calculate cement impedance. Minimum phase wavelets are a preferred type of drive pulse for use in acoustic or electromagnetic tools because they deliver an optimal waveform and the best signal with the least amount of power. Typical methods of calculating minimum phase wavelets involve tedious trial and error computations, which must be done prior to use, and stored in memory as a set of pre-calculated minimum phase wavelets. Thus, there are typically only a few pre-calculated wavelets for a given tool and there is typically no potential for real-time adaptation of the minimum phase wavelet.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to systems and methods for real-time adaptive minimum phase wavelet signal generation in a downhole tool.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot/tractor or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"), and wireline. In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

The present disclosure provides methods comprising: selecting a proposed pulse; generating a minimum phase wavelet based, at least in part, on the proposed pulse; generating a pulse signal within a wellbore based, at least in part, on the minimum phase wavelet; and receiving an echo signal corresponding to the pulse signal from at least a portion of the wellbore, wherein the echo signal is indicative of a wellbore property. In certain embodiments, a second proposed pulse is selected based, at least in part, on the echo signal; and the generating, and receiving steps are repeated for the second proposed pulse.

The present disclosure also provides methods comprising: selecting a proposed pulse; generating a minimum phase wavelet based, at least in part, on the proposed pulse; generating a pulse signal within a wellbore based, at least in part, on the minimum phase wavelet; and receiving an echo signal corresponding to the pulse signal reflecting from a wellbore casing, wherein the echo signal is indicative of a characteristic frequency of the wellbore casing; selecting a second proposed pulse based, at least in part, on the characteristic frequency of the wellbore casing; generating a second minimum phase wavelet based, at least in part, on the second proposed pulse; generating a second pulse signal within the wellbore based, at least in part, on the second minimum phase wavelet; and receiving a second echo signal corresponding to the second pulse signal reflecting from the wellbore casing, wherein the second echo signal is indicative of the characteristic frequency of the wellbore casing.

The present disclosure also provides systems comprising: a downhole tool; a transducer coupled to the downhole tool; and a controller communicably coupled to the transducer and configured to select a proposed pulse; generate a minimum phase wavelet based, at least in part, on the proposed pulse; cause the transducer to generate a pulse signal within a wellbore based, at least in part, on the minimum phase wavelet; and cause the transducer to receive an echo signal corresponding to the pulse signal from at least a portion of the wellbore, wherein the echo signal is indicative of a wellbore property.

As used herein, a "minimum phase wavelet" refers to a causal and stable discrete waveform which has finite time duration and a concentration of signal energy at the beginning portion of the waveform. In certain embodiments, minimum phase wavelets used as the drive pulse for acoustic or electromagnetic tools generate high-quality echo signals that are short in time while still comprising the desired formation information. In some embodiments, the minimum phase wavelet has the same or different spectral magnitude as the proposed pulse.

Figure 1:
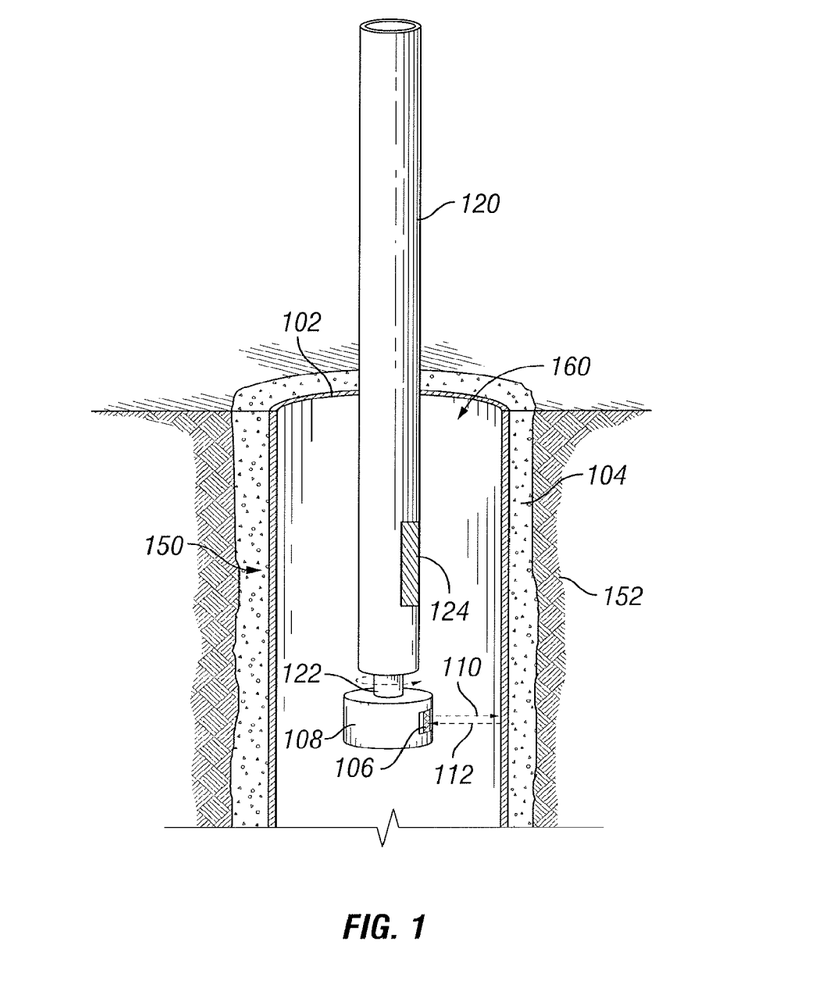
FIG. 1 is a diagram illustrating an example casing and cement evaluation tool, according to certain embodiments of the present disclosure.

FIG. 1 is a diagram illustrating an example casing and cement evaluation tool 100 with radially offset transducers 106 for use in in-situ fluid speed and attenuation measurements, according to aspects of the present disclosure. The tool 100 may comprise a tool that is suspended (e.g., via wireline, slickline, coiled tubing, drill pipe/tubing, downhole tractor, or the like) within a wellbore 150 in a subterranean formation 152. As depicted, the tool 100 may be positioned within a casing 102 that is secured in the wellbore 150 by a cement layer 104 that substantially fills the annulus between the casing 102 and the wellbore 150. The casing 102 is at least partially filled with fluid 160, which may comprise drilling fluid, water, and/or fluids from the formation 152. The casing 102 may comprise a metal tubular with a pre-determined length and diameter that is specifically selected for a particular depth in the formation 152. Although only one casing 102 is shown in FIG. 1, multiple casings may be used, including in a telescopic orientation where casings with progressively smaller diameters are used as the wellbore 150 extends further into the formation 152. The casing 102 may prevent the wellbore 150 from collapsing, prevent sensitive formation strata from exposure to downhole fluids, and prevent unwanted formation fluids from entering the wellbore 150.

The tool 100 comprises an elongated tool body 120 comprising a rotating head 108 with one or more transducers 106 coupled thereto. Example transducers include, but are not limited to, piezoelectric crystals, geophones, electromagnetic elements, etc. As depicted, the rotating head 108 is positioned at a distal end of the elongated tool body 120. In other embodiments, the rotation head 108 may be positioned at one or more intermediate portions of the elongated tool body 120, which may provide greater flexibility with respect to the tool design. As depicted, the diameter of the rotating head 108 is larger than the diameter of the elongated tool body 120, but other configurations are possible within the scope of the present disclosure.

The rotating head 108 may be driven by an electric motor (not shown) or another suitable drive mechanism that provides for the controlled rotational movement of the rotating head 108 with respect to the tool 100. As depicted, the rotating head 108 is driven through a shaft 122 connecting the rotating head 108 to a drive mechanism within the elongated tool body 120. Power for the drive mechanism and other elements within the tool 100 may be provided, for instance, through the means of suspension, or by one or more power sources, e.g., batteries, capacitors, generators, within the tool 100.

Generally, the tool 100 functions by transmitting a directional acoustic pulse signal 110 from a transducer 106 to the casing 102. The directional acoustic pulse signal 110 is not limited with respect to frequency and can but is not required to be an ultrasonic pulse. The directional acoustic pulse signal 110 may be a pulse signal based, at least in part, on a minimum phase wavelet. That pulse signal 110 may contact, be reflected by, and/or cause to reverberate the casing 102, the cement layer 104, and the interface between the casing 102 and the cement layer 104. These reflections and reverberations may comprise an echo signal 112 that is received by the transducer 106 that transmitted the pulse signal. In certain embodiments, the echo signal 112 is indicative of a wellbore property. Once received by the transducer 106, the echo signal 112 may be transmitted to one or more control systems (not shown) associated with the tool 100 to calculate or otherwise determine characteristics of the casing 102 and cement layer 104, such as the cement impedance, or to calculate a second minimum phase wavelet.

In certain embodiments, a controller associated with the tool 100 may be configured to select a proposed pulse, generate a minimum phase wavelet based, at least in part, on the proposed pulse, generate a pulse signal 110 within the wellbore 150 based, at least in part, on the minimum phase wavelet; and receive an echo signal 112 corresponding to the pulse signal from at least a portion of the wellbore 150. In certain embodiments, the controller may be communicably coupled to the transducer. The controller may comprise a control unit located within the downhole tool, at the surface, or a combination of the two.

As used herein, a control system may comprise an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), field programmable gate arrays (FPGA), or any other digital or analog circuitry configured to interpret and/or execute program instructions and/or process data. The one or more control systems associated with the tool 100 could be, for example, wholly within the tool 100, located at the surface, or a combination of the two (e.g., some processing occurring downhole and some done at the surface).

The speed and attenuation characteristics of the fluid 160 within the casing 102 may affect the pulse signals 110 by skewing or otherwise reducing the amplitude of the pulses, which in turn may affect the amplitude of the echo signal 112. Additionally, the speed and attenuation characteristics of the fluid 160 may alter the frequency response of the pulse signals 110 and the echo signal 112. These effects can be accounted for when the characteristics of the casing 102 and cement 104 are calculated or determined, provided values for the speed and attenuation characteristics. Typically, these values are either estimated based on experimental values or measured in-situ using a dedicated transducer with a known offset distance from a reference block, as is the case in the mud cell 124 present in the tool 100.

Figure 2:
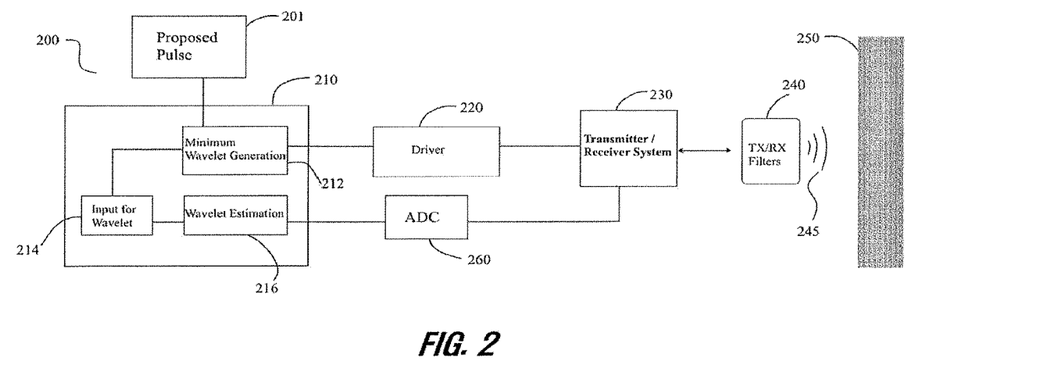
FIG. 2 is a block flow diagram illustrating a feedback system used to determine a minimum phase wavelet for an example cement and casing evaluation tool, according to certain embodiments of the present disclosure.

FIG. 2 is a block flow diagram illustrating a feedback system 200 used to determine a minimum phase wavelet for an example cement and casing evaluation tool, according to certain embodiments of the present disclosure. Initially, a proposed pulse may be selected 201. In some embodiments, the spectral magnitude of the proposed pulse may be determined based on one or more real-time wellbore conditions, including, but not limited to borehole fluid attenuation. A minimum phase wavelet may be determined and/or generated 212 based, at least in part, on the proposed pulse 201. The minimum phase wavelet generation may occur within a digital signal processing and/or field programmable gate array unit 210. The digital signal processing 210 and minimum phase wavelet generation 212 may be carried out by an information handling system within a downhole tool and/or on the surface. In some embodiments, the minimum phase wavelet generation and other processing occurs in-situ in real time. In certain embodiments, the minimum phase wavelet is generated based, at least in part, by calculating a real cepstrum of the proposed pulse.

Figure 3:
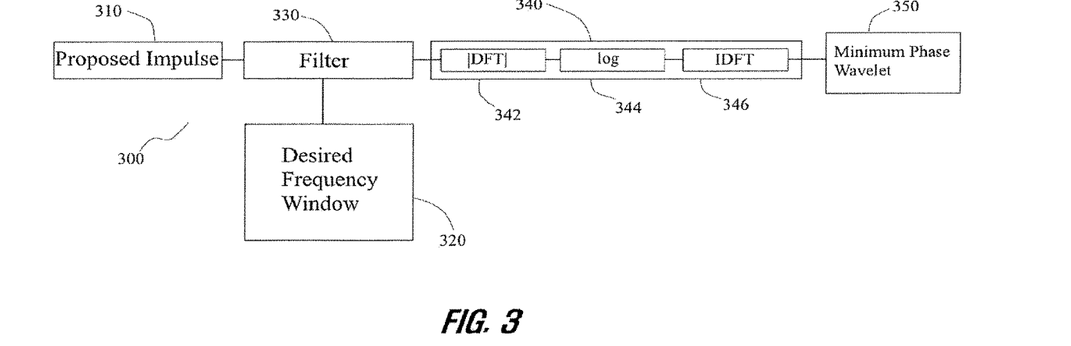
FIG. 3 is a block flow diagram illustrating a real cepstrum analysis of a proposed pulse, according to certain embodiments of the present disclosure.

FIG. 3 is a block flow diagram illustrating a cepstrum analysis of a proposed pulse, according to certain embodiments of the present disclosure. The algorithm 300 constructs a minimum phase wavelet 350 based on a proposed pulse 310. First, the proposed pulse 310 is filtered 330. In some embodiments, the filter is selected based, at least in part, on a desired frequency window 320. Real cepstrum analysis 340 is performed on the filtered pulse 330. In certain embodiments, calculating the real cepstrum 340 comprises transforming the filtered pulse 330 by a Discrete Fourier Transform (DFT) 342 into the frequency domain equivalent. The common logarithm of the spectral magnitude of the frequency domain equivalent is taken 344, and the result is transformed by the Inverse Discrete Fourier Transform (IDFT) 346 back into the time domain. The output of the algorithm 300 is a time domain minimum phase wavelet 350 based, at least in part, on the proposed pulse 310. In certain embodiments, the DFT and IDFT may be calculated by the Fast Fourier Transform and inverse Fast Fourier Transform algorithms, respectively.

Returning to the feedback system of FIG. 2, the constructed minimum phase wavelet is transmitted to a driver 220 and to the transmitter/receiver system 230 (e.g., transducer). The transmitter/receiver system 230 generates a pulse signal 245 within a wellbore based, at least in part, on the minimum phase wavelet. In some embodiments, the generated pulse signal 245 is transmitted through the wellbore to an acoustic target 250. In some embodiments, the acoustic target may be a portion of the wellbore, such as the casing 250. Portions of the pulse signal 245 are transmitted into, absorbed by, and/or reverberated within the casing 250. In some embodiments, the casing 250 has a characteristic frequency directly depending on its thickness. In some embodiments, for example, if a casing is 1 inch thick, then the largest reverberation response signal may be about 114 kHz for a normal oil field casing material. An echo signal 245 corresponding to the pulse signal 245 is received by the transmitter/receiver system 230.

In some embodiments, at least one of the pulse signal and echo signal 245 is filtered 240. The echo signal 245 may be digitized by an analog to digital converter 260 prior to the selection of a second proposed pulse 216. The digitized signal may be transmitted to a digital signal processor and/or other information handling system. In some embodiments, the characteristic frequency band of the casing 250 may be determined from the echo signal 245. In some embodiments, the echo signal 245 may be indicative of a wellbore property, such as a wellbore condition (e.g., drilling fluid attenuation) or characteristic (e.g., casing thickness). For example, the wellbore property may include physical characteristics (e.g., impedance, thickness, slowness, reflectance) of the casing layer 250 and/or a cement layer. In certain embodiments, the echo signal may be indicative of at least one of a casing thickness, a casing impedance, a casing slowness, a casing reflectance, and a casing characteristic frequency. In some embodiments, the echo signal may be indicative of at least one of a cement layer thickness, a cement layer impedance, a cement layer slowness and a cement layer reflectance.

In some embodiments, a second minimum phase wavelet is generated 212 by estimating a wavelet 216 based, at least in part, on the echo signal 245 and using it as an input 214 for a second minimum wavelet generation 212. In some embodiments, a second proposed pulse may be selected and/or estimated 216 based, at least in part, on the echo signal 245 and used as an input 214 for a second minimum wavelet generation 212. In some embodiments, the spectral magnitude of the second proposed pulse may be determined based, at least in part, on the echo signal 245. In some embodiments, a second proposed pulse may be selected 216 based, at least in part, on the characteristic frequency of the wellbore casing 250. A second minimum phase wavelet may be generated based, at least in part, on the second proposed pulse. In certain embodiments, a second minimum phase wavelet may be generated by calculating a real cepstrum of the second proposed pulse. The second minimum phase wavelet may be transmitted to the driver 220 and transmitter/receiver system 230 to generate a second pulse signal 245 within the wellbore. The second pulse signal 245 may reflect off at least a second portion of the wellbore, such as the wellbore casing 250. The reflected portion of the second pulse signal 245 may be received by the transmitter/receiver system 230 as a second echo signal 245. The second echo signal 245 may be indicative of a wellbore property, such as a wellbore condition (e.g., drilling fluid attenuation) or characteristic (e.g., casing thickness). For example, the wellbore property may include physical characteristics (e.g., impedance, thickness, slowness, reflectance) of the casing layer 250 and/or a cement layer. In certain embodiments, the second echo signal is indicative of the characteristic frequency of the wellbore casing 250.

In certain embodiments, a feedback loop comprising selecting proposed pulses 216 based on echo signals 245 may provide an optimized minimum phase wavelet. In certain embodiments, a feedback loop may comprise selecting proposed pulses, generating minimum phase wavelets based, at least in part, on those proposed pulses, generating pulse signals based, at least in part, on the minimum phase wavelets, and receiving echo signals corresponding to the pulse signals from at least a portion of the wellbore. In certain embodiments, the feedback loop is performed until it generates an optimized minimum phase wavelet.

Figure 4:
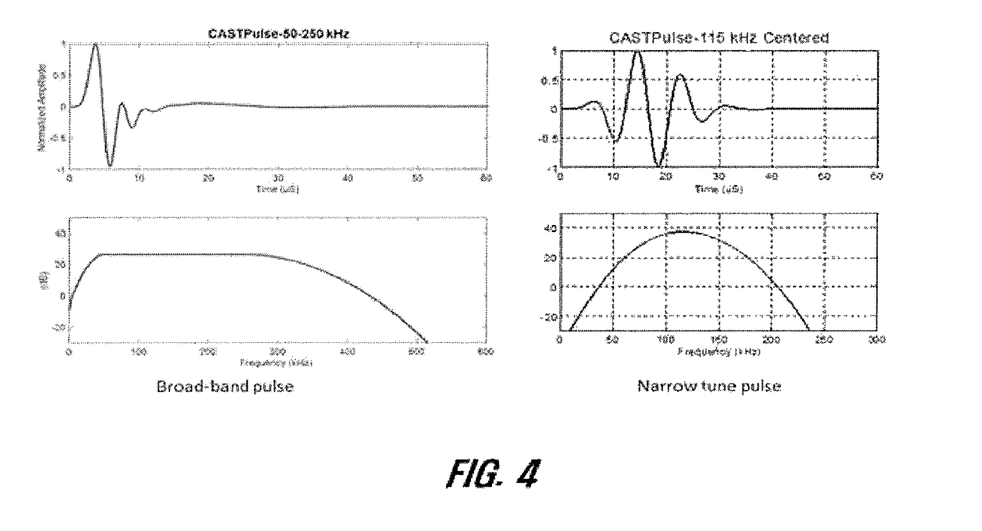
FIG. 4 is a set of graphs of example minimum phase wavelets in time and frequency domains, according to certain embodiments of the present disclosure.

FIG. 4 is a set of graphs of example minimum phase wavelets in time and frequency domains, according to certain embodiments of the present disclosure. The two graphs in the left-hand column represent a minimum phase wavelet broadband pulse spanning 50-250 kHz. The two graphs in the right-hand column represent a minimum phase wavelet of a narrow tune pulse centered at 115 kHz.

Figures 5, 6:
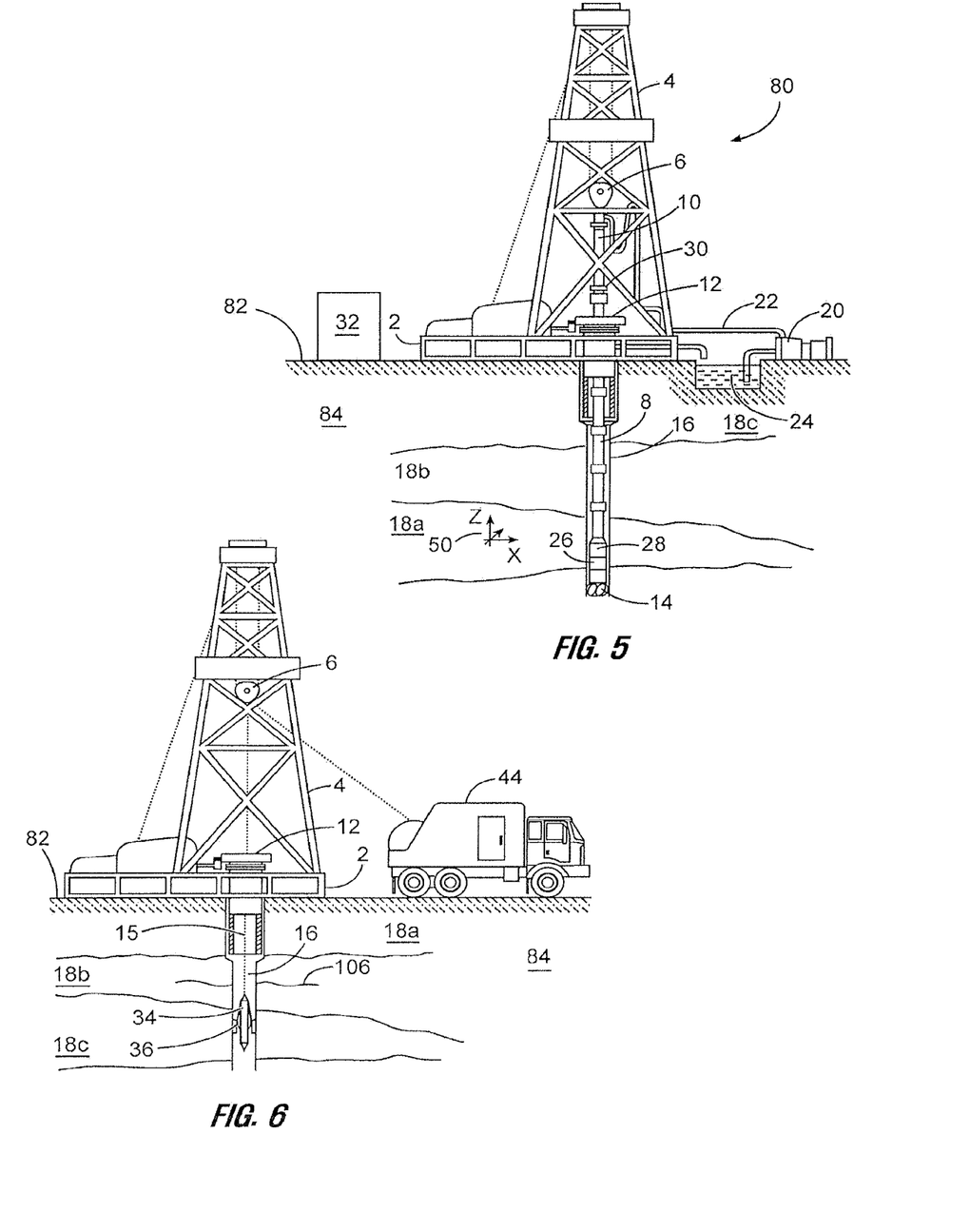
FIG. 5 is a diagram showing an illustrative drilling system, according to aspects of the present disclosure.
FIG. 6 is a diagram showing an illustrative wireline logging system, according to aspects of the present disclosure.

One or more of the methods described above may be incorporated into/with a wireline tool/sonde for wireline logging operation or into/with one or more LWD/MWD tools for drilling operations. FIG. 5 is a diagram showing a subterranean drilling system 80 incorporating at least one acoustic LWD/MWD downhole tool 26, according to aspects of the present disclosure. The drilling system 80 comprises a drilling platform 2 positioned at the surface 82. As depicted, the surface 82 comprises the top of a formation 84 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18a-c. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including the acoustic tool 26. In one or more embodiments, the tool 26 may comprise acoustic pulse excitation and echo/reflection reception functionality that will be described in detail below. As the bit extends the borehole 16 through the formations 18a-c, the tool 26 may collect measurements relating to borehole 16 and the formation 84. In certain embodiments, the orientation and position of the acoustic tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the downhole tool 26 may be communicably coupled to a telemetry element 28. The telemetry element 28 may transfer measurements from acoustic tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 102. The surface control unit 32 may comprise an information handling system communicably coupled to the surface receiver 30 and may receive measurements from the acoustic tool 26 and/or transmit commands to the acoustic tool 26 though the surface receiver 30. The surface control unit 32 may also receive measurements from the acoustic tool 26 when the acoustic tool 26 is retrieved at the surface 102. As is described above, the surface control unit 32 may process some or all of the measurements from the acoustic tool 26 to determine certain parameters of downhole elements, including the borehole 16 and formation 84.

At various times during the drilling process, the drill string 8 may be removed from the borehole 16 as shown in FIG. 6. Once the drill string 8 has been removed, measurement/logging operations can be conducted using a wireline tool 34, e.g., an instrument that is suspended into the borehole 16 by a cable 15 having conductors for transporting power to the tool and telemetry from the tool body to the surface 102. The wireline tool 34 may comprise an acoustic tool 36, similar to the acoustic tool 26 described above. The tool 36 may be communicatively coupled to the cable 15. A logging facility 44 (shown in FIG. 5 as a truck, although it may be any other structure) may collect measurements from the acoustic tool 36, and may include computing facilities (including, e.g., a control unit/information handling system) for controlling, processing, storing, and/or visualizing some or all of the measurements gathered by the tool 36. The computing facilities may be communicatively coupled to the acoustic tool 36 by way of the cable 15. In certain embodiments, the control unit 32 may serve as the computing facilities of the logging facility 44.

An example method may include selecting a proposed pulse. A minimum phase wavelet may be generated based, at least in part, on the proposed pulse. A pulse signal within a wellbore may be generated based, at least in part, on the minimum phase wavelet. An echo signal corresponding to the pulse signal from at least a portion of the wellbore may be received, wherein the echo signal is indicative of a wellbore property.

In one or more embodiments described in the preceding paragraph, generating the minimum phase wavelet comprises calculating a real cepstrum of the proposed pulse.

In one or more embodiments described in the preceding two paragraphs, the minimum phase wavelet has the same spectral magnitude as the proposed pulse.

In one or more embodiments described in the preceding three paragraphs, the spectral magnitude of the proposed pulse is determined based, at least in part, on one or more real-time wellbore conditions.

In one or more embodiments described in the preceding four paragraphs, wherein calculating the real cepstrum of the proposed pulse comprises calculating an inverse discrete Fourier transform of a log spectral magnitude of the proposed pulse.

In one or more embodiments described in the preceding five paragraphs, calculating the real cepstrum of the proposed pulse further comprises filtering the proposed pulse.

In one or more embodiments described in the preceding six paragraphs, the method further comprises selecting a second proposed pulse based, at least in part, on the echo signal; and repeating the generating and receiving steps for the second proposed pulse.

In one or more embodiments described in the preceding seven paragraphs, a spectral magnitude of the second proposed pulse is determined based, at least in part, on the echo signal.

In one or more embodiments described in the preceding eight paragraphs, the echo signal is digitized by an analog to digital converter prior to the selection of the second proposed pulse.

In one or more embodiments described in the preceding nine paragraphs, the method further comprises repeating the selecting, generating, and receiving steps in a feedback loop.

In one or more embodiments described in the preceding ten paragraphs, the feedback loop generates an optimized minimum phase wavelet.

In one or more embodiments described in the preceding eleven paragraphs, the echo signal is indicative of at least one of a casing thickness, a casing impedance, a casing slowness, a casing reflectance, and a casing characteristic frequency.

In one or more embodiments described in the preceding twelve paragraphs, the echo signal is indicative of at least one of a cement layer thickness, a cement layer impedance, a cement layer slowness and a cement layer reflectance.

In one or more embodiments described in the preceding thirteen paragraphs, the pulse signal is generated by a downhole tool comprising a transducer.

In one or more embodiments described in the preceding fourteen paragraphs, the downhole tool comprises a rotating head to which the transducer is coupled.

An example method may include selecting a proposed pulse. A minimum phase wavelet may be generated based, at least in part, on the proposed pulse. A pulse signal may be generated within a wellbore based, at least in part, on the minimum phase wavelet. An echo signal corresponding to the pulse signal reflecting from a wellbore casing may be received, wherein the echo signal is indicative of a characteristic frequency of the wellbore casing. A second proposed pulse may be selected based, at least in part, on the characteristic frequency of the wellbore casing. A second minimum phase wavelet may be generated based, at least in part, on the second proposed pulse. A second pulse signal may be generated within the wellbore based, at least in part, on the second minimum phase wavelet. A second echo signal corresponding to the second pulse signal reflecting from the wellbore casing may be received, wherein the second echo signal is indicative of the characteristic frequency of the wellbore casing.

In one or more embodiments described in the preceding paragraph, the method may further comprise repeating the selecting, generating, and receiving steps in a feedback loop.

In one or more embodiments described in the preceding two paragraphs, the feedback loop generates an optimized minimum phase wavelet.

An example system may include a downhole tool. A transducer may be coupled to the downhole tool. A controller may be communicably coupled to the transducer and configured to select a proposed pulse; generate a minimum phase wavelet based, at least in part, on the proposed pulse; cause the transducer to generate a pulse signal within a wellbore based, at least in part, on the minimum phase wavelet; and cause the transducer to receive an echo signal corresponding to the pulse signal from at least a portion of the wellbore, wherein the echo signal is indicative of a wellbore property.

In one or more embodiments described in the preceding paragraph, the downhole tool comprises a rotating head to which the transducer is coupled.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method comprising:
   selecting a proposed pulse;
   generating a minimum phase wavelet, at least in part, by calculating a real cepstrum of the proposed pulse;
   generating a pulse signal within a wellbore based, at least in part, on the minimum phase wavelet; and
   receiving an echo signal corresponding to the pulse signal from at least a portion of the wellbore, wherein the echo signal is indicative of a wellbore property.

2. The method of claim 1, wherein the minimum phase wavelet has the same spectral magnitude as the proposed pulse.

3. The method of claim 1, wherein the spectral magnitude of the proposed pulse is determined based, at least in part, on one or more real-time wellbore conditions.

4. The method of claim 1, wherein calculating the real cepstrum of the proposed pulse comprises calculating an inverse discrete Fourier transform of a log spectral magnitude of the proposed pulse.

5. The method of claim 4, wherein calculating the real cepstrum of the proposed pulse further comprises filtering the proposed pulse.

6. The method of claim 1, further comprising the steps of:
   selecting a second proposed pulse based, at least in part, on the echo signal; and
   repeating the generating and receiving steps for the second proposed pulse.

7. The method of claim 6, wherein a spectral magnitude of the second proposed pulse is determined based, at least in part, on the echo signal.

8. The method of claim 6, wherein the echo signal is digitized by an analog to digital converter prior to the selection of the second proposed pulse.

9. The method of claim 6, further comprising repeating the selecting, generating, and receiving steps in a feedback loop.

10. The method of claim 1, wherein the echo signal is indicative of at least one of a casing thickness, a casing impedance, a casing slowness, a casing reflectance, and a casing characteristic frequency.

11. The method of claim 1, wherein the echo signal is indicative of at least one of a cement layer thickness, a cement layer impedance, a cement layer slowness and a cement layer reflectance.

12. The method of claim 1, wherein the pulse signal is generated by a downhole tool comprising a transducer.

13. The method of claim 12, wherein the downhole tool comprises a rotating head to which the transducer is coupled.

14. A method comprising:
    selecting a proposed pulse;
    generating a minimum phase wavelet based, at least in part, on the proposed pulse, wherein a signal energy of the minimum phase wavelet is more concentrated than a signal energy of the proposed pulse;
    generating a pulse signal within a wellbore based, at least in part, on the minimum phase wavelet; and
    receiving an echo signal corresponding to the pulse signal reflecting from a wellbore casing, wherein the echo signal is indicative of a characteristic frequency of the wellbore casing;
    selecting a second proposed pulse based, at least in part, on the characteristic frequency of the wellbore casing;
    generating a second minimum phase wavelet based, at least in part, on the second proposed pulse;
    generating a second pulse signal within the wellbore based, at least in part, on the second minimum phase wavelet; and
    receiving a second echo signal corresponding to the second pulse signal reflecting from the wellbore casing, wherein the second echo signal is indicative of the characteristic frequency of the wellbore casing.

15. The method of claim 14, further comprising repeating the selecting, generating, and receiving steps in a feedback loop.

16. A system comprising:
    a downhole tool;
    a transducer coupled to the downhole tool; and
    a controller communicably coupled to the transducer and configured to
    select a proposed pulse;
    generate a minimum phase wavelet, at least in part, by calculating a real cepstrum of the proposed pulse;
    cause the transducer to generate a pulse signal within a wellbore based, at least in part, on the minimum phase wavelet; and
    cause the transducer to receive an echo signal corresponding to the pulse signal from at least a portion of the wellbore, wherein the echo signal is indicative of a wellbore property.

17. The system of claim 16, wherein the downhole tool comprises a rotating head to which the transducer is coupled.

* * * * *